(12) United States Patent
Iguchi et al.

(10) Patent No.: US 6,973,754 B2
(45) Date of Patent: Dec. 13, 2005

(54) WINDOWPANE ATTACHING STRUCTURE AND WINDOWPANE REMOVING METHOD

(75) Inventors: Shigehiko Iguchi, Chita-gun (JP); Nobuyuki Tamai, Chita-gun (JP); Nobutaka Kojima, Chita-gun (JP)

(73) Assignee: Asahi Glass Company, Limited, Tokyo (JP)

(*) Notice: Subject to any disclaimer, the term of this patent is extended or adjusted under 35 U.S.C. 154(b) by 415 days.

(21) Appl. No.: 10/279,985

(22) Filed: Oct. 25, 2002

(65) Prior Publication Data
US 2003/0084625 A1 May 8, 2003

Related U.S. Application Data

(63) Continuation of application No. PCT/JP01/03520, filed on Apr. 24, 2001.

(30) Foreign Application Priority Data
Apr. 27, 2000 (JP) ........................................ 2000-127817

(51) Int. Cl.[7] ................................................. E06B 3/62
(52) U.S. Cl. ..................... 52/208; 52/209; 52/204.51; 52/204.55; 52/204.591; 52/716.1; 52/717.01; 52/214; 52/698; 296/84.1; 296/93; 296/96.13; 296/96.21; 296/96.22; 296/146.1; 296/146.3; 296/154; 296/201; 296/208; 296/213; 49/380; 49/475.1; 49/476; 49/449; 49/490; 49/491
(58) Field of Search ..................... 52/204.51, 204.55, 52/204.591, 208, 209, 716.1, 717.01, 533, 534, 214, 698; 296/201, 84.1, 146.1, 146.3, 93, 96.21, 96.13, 96.22, 154, 208, 213; 49/476, 449, 380, 475.1, 490, 491

(56) References Cited

U.S. PATENT DOCUMENTS

| 4,364,595 | A | | 12/1982 | Morgan et al. |
| 4,487,448 | A | * | 12/1984 | Griffin .................... 296/146.15 |
| 4,591,203 | A | * | 5/1986 | Furman ..................... 296/201 |
| 4,700,525 | A | * | 10/1987 | Nieboer et al. ............... 52/698 |
| 4,723,809 | A | * | 2/1988 | Kida et al. ............... 296/96.21 |
| 4,823,511 | A | * | 4/1989 | Herliczek et al. ............. 49/404 |
| 4,841,698 | A | * | 6/1989 | Gold .......................... 52/208 |
| 4,861,540 | A | * | 8/1989 | Nieboer et al. ............. 264/263 |
| 4,894,972 | A | * | 1/1990 | Endoh et al. ............ 52/717.01 |
| 4,905,432 | A | * | 3/1990 | Romie ......................... 52/208 |
| 4,974,901 | A | * | 12/1990 | Katayama .................. 296/201 |
| 4,986,595 | A | * | 1/1991 | Gold .......................... 296/201 |
| 5,083,835 | A | * | 1/1992 | Rossini ..................... 296/201 |

(Continued)

FOREIGN PATENT DOCUMENTS

| EP | 0 079 839 | 5/1983 |
| EP | 0 618 101 | 10/1994 |
| JP | 1-101220 | 4/1989 |
| JP | 1-161810 | 11/1989 |

*Primary Examiner*—Carl D. Friedman
*Assistant Examiner*—Christy M. Green
(74) *Attorney, Agent, or Firm*—Oblon, Spivak, McClelland, Maier & Neustadt, P.C.

(57) ABSTRACT

A windowpane is supported in a gasket by a support member so that a space for allowing the windowpane to shift therein is ensured between an end surface of the windowpane and a surface in a channel of the gasket facing the end surface, the gasket having the channel for receiving a peripheral edge of the windowpane, and the support member being removable from the gasket. The windowpane can be easily removed from a body panel by removing the support member and shifting the windowpane into the space.

7 Claims, 5 Drawing Sheets

U.S. PATENT DOCUMENTS

| | | | |
|---|---|---|---|
| 5,085,021 A | * 2/1992 | Kunert | 52/208 |
| 5,261,721 A | * 11/1993 | Conger et al. | 296/146.15 |
| 5,339,584 A | * 8/1994 | Ohtake et al. | 52/208 |
| 5,442,880 A | * 8/1995 | Gipson | 49/413 |
| 5,475,956 A | * 12/1995 | Agrawal et al. | 52/208 |
| 5,522,191 A | * 6/1996 | Wenner et al. | 52/204.51 |
| 5,529,366 A | * 6/1996 | Gold | 296/96.21 |
| 5,635,281 A | * 6/1997 | Agrawal | 428/192 |
| 5,707,473 A | * 1/1998 | Agrawal et al. | 156/245 |
| 5,822,932 A | * 10/1998 | Agrawal | 52/204.597 |
| 5,864,996 A | * 2/1999 | Veldman et al. | 52/204.597 |
| 6,089,646 A | * 7/2000 | Xu et al. | 296/146.15 |
| 6,293,609 B1 | * 9/2001 | Xu et al. | 296/146.15 |
| 6,460,917 B2 | * 10/2002 | De Paoli | 296/201 |

* cited by examiner

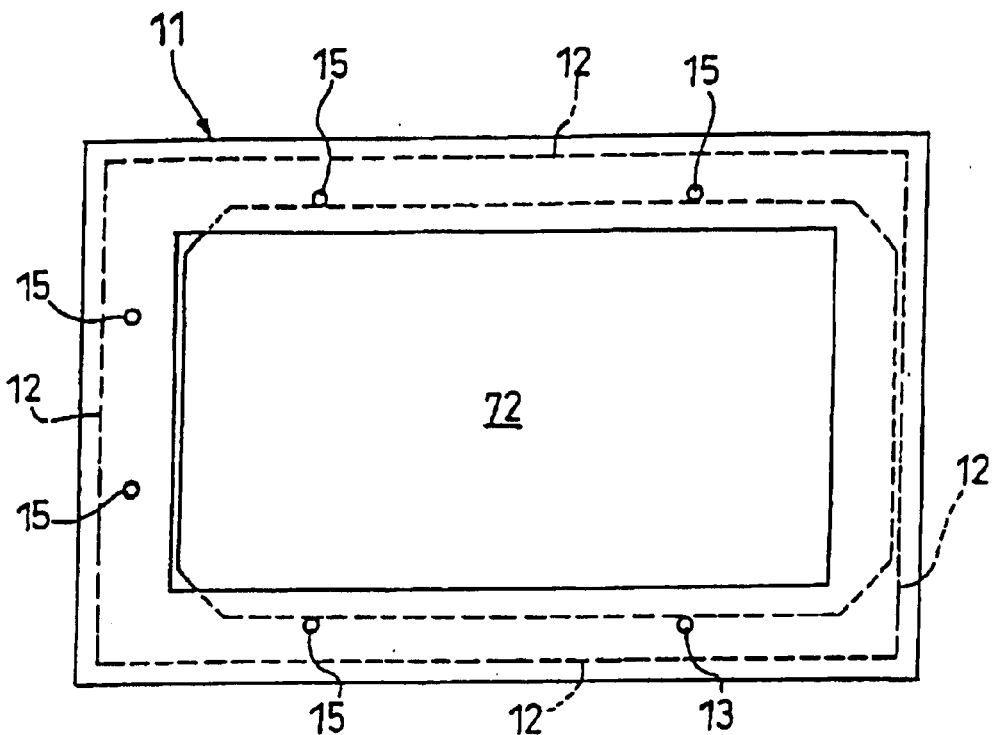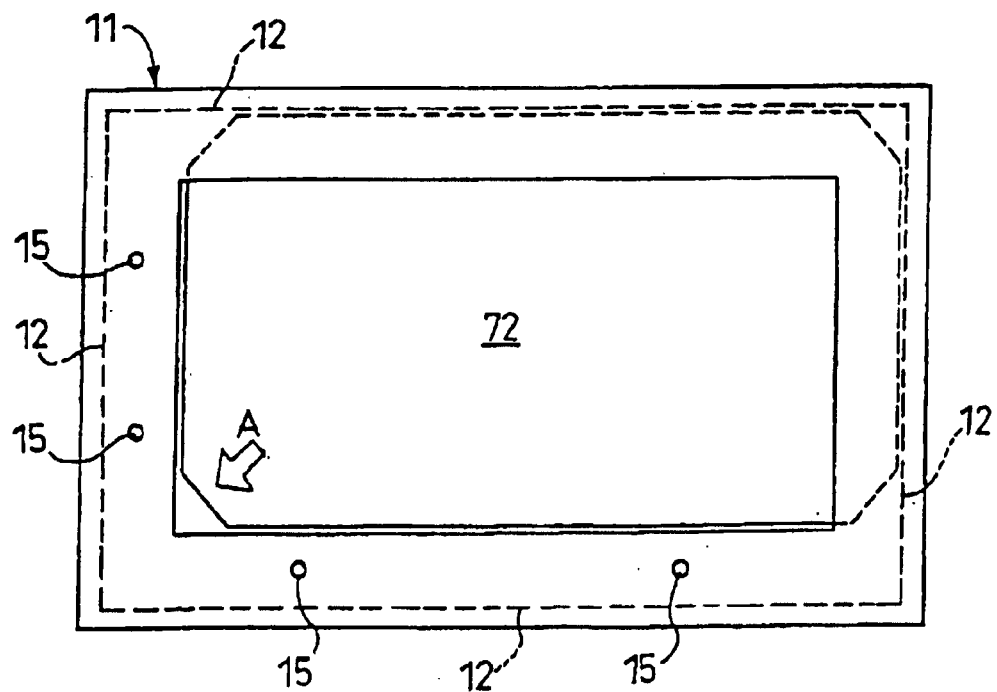

WINDOWPANE ATTACHING STRUCTURE AND WINDOWPANE REMOVING METHOD

CROSS REFERENCE TO RELATED APPLICATION

This is a Continuation Application of PCT Application No. PCTIJP01/03520, filed on Apr. 24, 2001, which was not published under PCT Article 21(2) in English. This application is based upon and claims the benefit of priority from the prior Japanese Patent Application No. 2000-127817, filed Apr. 27, 2000, the entire contents of which are incorporated herein by reference.

TECHNICAL FIELD

The present invention relates a windowpane attaching structure for a window opening of an automobile and a method for removing a windowpane from a window opening of an automobile.

BACKGROUND ART

As shown in FIG. 9, an automobile 70 has a body panel 70a formed with a plurality of window openings 75. The window openings 75 are closed by windowpanes, which comprise transparent glass sheets 72.

In Description, the upper edge of a glass sheet (windowpane) 72 refers to an edge along the roof 79 of the automobile 70, and the lateral edges of the glass sheet 72 refer to edges along pillars 77 of the automobile 70.

FIG. 10 is a cross-sectional view taken along line X—X of FIG. 9. The upper edge as a part of the peripheral edge of the glass sheet 72 is firmly attached, by an adhesive 71, to an attachment flange 76, which is provided at the peripheral edge around a window opening 75 of the body panel 70a and on an interior side behind the body panel 70a. The attachment flange 76 and the body panel 70a are connected by an opening side wall 75a. The attachment flange 76 extends along the peripheral edge of the window opening 75 of the body panel 70a. The attachment flange 76 has the upper edge and the lateral edges of the glass sheet 72 bonded thereto.

If a bonded portion can be seen from an exterior side through the transparent glass sheet 72, or if the adhesive 71 or the like is seen, the appearance degrades. If a bonded portion is irradiated by sunshine from the exterior side through the transparent glass sheet 72, the adhesive 71 is deteriorated by the ultraviolet in the sunshine.

In order to cope with this problem, the peripheral edge of the glass sheet 72 has a rear side (interior side) provided with a coating member 73 in a dark color. The adhesive 71 is interposed between the coating member 73 and the attachment flange 76. When seen from the exterior side, the adhesive 71 is concealed by the coating member 73. For example, a black coating member, which comprises, e.g., a fired product made of ceramic paste, has been used as the coating member 73 in a dark color.

In recent years, the glass sheet 72 for an automobile has been demanded to be configured so as to be capable of easily and rapidly removed from the body panel 70a on the assumption that the glass sheet would be recycled.

However, the glass sheet has been unable to be removed in simple fashion in the prior art stated earlier since the glass sheet 72 is firmly fixed to the body panel 70a by the adhesive 71. In order to remove the glass sheet in the prior art, a thread-shaped cutter or a bar-shaped cutter has been passed through the adhesive shown in FIG. 10 in right and left directions in this figure and is moved along the peripheral edge of the window opening (in a direction perpendicular to the sheet showing this figure) to cut the adhesive 71. This operation has been troublesome, placed a great deal of burden on the operator and required a long period for the operation.

It is an object of the present invention to provide a windowpane attaching structure and a windowpane removing method capable of easily removing a windowpane from the body panel of an automobile.

DISCLOSURE OF THE INVENTION

In order to attain the object, the present invention provides a windowpane attaching structure, wherein a windowpane has a peripheral edge received in a channel of a gasket having a C-character shape in section, the windowpane has the gasket fitted thereto, and the windowpane is attached to a window opening of an automobile through the gasket, characterized in that the windowpane has a space formed between an end surface thereof and a surface in the channel facing the end surface at at least a portion of an entire periphery thereof, the space allowing the windowpane to shift in the channel; and a support member is fastened to the gasket so as to get in contact with the end surface of the windowpane for supporting the windowpane in the channel without shifting therein, the support member being removable from the gasket.

In order to attain the object, the present invention also provides a windowpane removing method for removing a windowpane from a windowpane attaching structure, wherein a windowpane has a peripheral edge received in a channel of a gasket having a C-character shape in section, the windowpane has the gasket fitted thereto, and the windowpane is attached to a window opening of an automobile through the gasket; characterized in that the windowpane attaching structure is configured to support the windowpane in the gasket by a support member so as to ensure a space between an end surface of the peripheral edge of the windowpane and a surface in the channel, the support member being removable from the gasket; and the support member is removed from the gasket, the windowpane is properly moved so as to shift into and out of the channel, and the windowpane is removed from the window opening.

Examples of the windowpane are a transparent or translucent glass sheet and a transparent or translucent resin sheet. A chromatic glass sheet or a chromatic resin sheet is also applicable as long as the sheet has enough transparence. Examples of the glass sheet are a single layer glass sheet and a laminated glass sheet. The glass sheet may be tempered or have a functional coating, such as an infrared reflection film, applied thereto.

Examples of the gasket are a hard molding having a C-character shape in section and a metallic member having a C-character shape in section and covered by proper buffer material.

In the windowpane attaching structure and the windowpane removing method according to the present invention, the gasket is fitted to the peripheral edge of a windowpane, and the gasket is firmly fixed to the window opening of an automobile by use of, e.g., an adhesive. When the windowpane is removed, the support member is removed from the gasket first. Thus, the windowpane can be shifted into and out of the space formed between the peripheral end surface of the windowpane and the surface in the channel. The windowpane is properly shifted in a surface direction thereof and is removed from the window opening.

In accordance with the present invention, the windowpane can be removed from the body panel of the automobile in extremely easy fashion and in a short period of time.

In the windowpane attaching structure according to the present invention, it is preferable that the windowpane has an outline, which is larger than an outline formed by an inner periphery of the gasket and smaller than an outline around the surface in the channel in a projected view. By this arrangement, the windowpane can be stably retained in the window opening so that the windowpane is removable.

The outline of the windowpane in the projected view means a shape formed by the periphery of the windowpane that is seen from a direction perpendicular to the surface direction of the windowpane when the windowpane is projected on a projected plane. The outline of the windowpane in the projected view is indicated by symbol P in FIG. 2 and FIG. 8.

The outline formed by the inner periphery of the gasket means a shape formed by the inner periphery of an annular gasket fitted to the entire periphery of the windowpane or a shape of the inner periphery of a combined gasket formed by smoothly connecting the inner edges of plural gasket sections provided at intervals around the peripheral edge of the windowpane in the peripheral direction when the windowpane is seen from a direction perpendicular to the surface direction of the windowpane. The outline formed by the inner periphery of the gasket is indicated by symbol I in FIG. 2 and FIG. 8.

The outline around the surface in the channel means a shape formed by the surface provided in the channel of an annular gasket fitted to the entire periphery of the windowpane and facing the end surface of the peripheral edge of the windowpane or a shape of the inner periphery of a combined gasket formed by smoothly connecting the inner edges of plural gasket sections provided at intervals around the peripheral edge of the windowpane in the peripheral direction when the windowpane is seen from a direction perpendicular to the surface direction of the windowpane. The outline around the surface in the channel is indicated by symbol G in FIG. 2 and FIG. 8.

The phrases "inner periphery" and "outer periphery" mean a periphery closer to the center of the windowpane and a periphery away from the center in the surface direction of the windowpane, respectively.

The phrase "C-character shape in section" with respect to the shape of the gasket covers a shape similar to a C-character having no angular corners in section and a shape similar to a substantially C-character having angular corners in section.

BRIEF DESCRIPTION OF THE DRAWINGS

FIG. 3 is a front view showing the first mode of the windowpane removing method according to the present invention;

FIG. 4 is a front view showing the first mode of the window pane removing method according to the present invention;

BEST MODE FOR CARRYING OUT THE INVENTION

Figure 1:
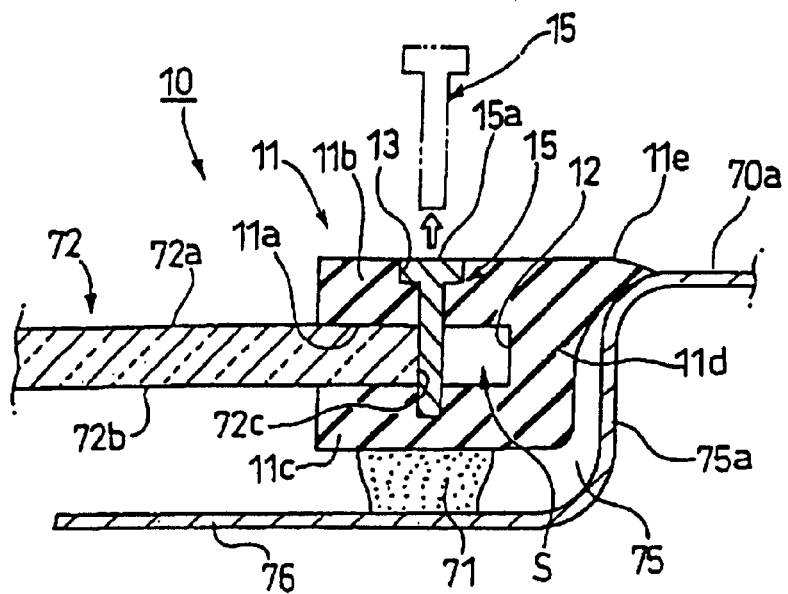
FIG. 1 is a schematic cross-sectional view showing the essential parts of a first mode of the windowpane attaching structure according to the present invention.

Now, embodiments of the present invention will be described in detail in reference to the accompanying drawings. In explanation of the embodiments stated below, parts having the same structure or function as the parts previously stated will be indicated by the same or corresponding reference numerals or symbols in the drawings, and explanation of these parts will be omitted.

Figure 9:
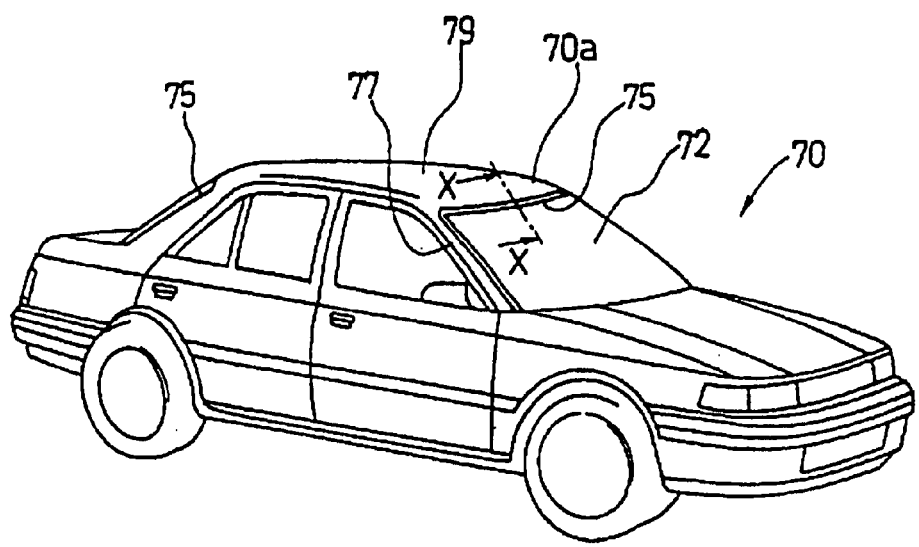
FIG. 9 is a perspective view of an automobile.
Figure 10:
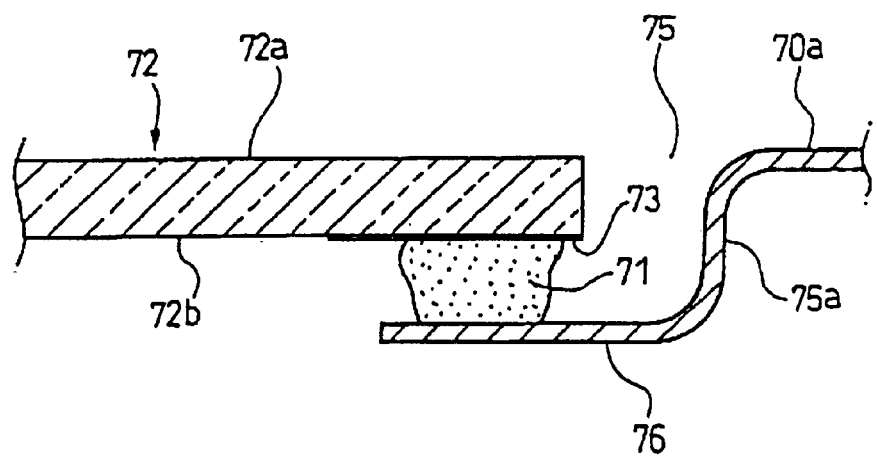
FIG. 10 is a cross-sectional view taken along line X—X of FIG. 9.

FIG. 1 is a schematic cross-sectional view of a first mode of the windowpane attaching structure according to an embodiment of the present invention. The windowpane attaching structure 10 is applicable to a windowpane, such as the windshield glass or the backlite of an automobile 70 as shown in FIG. 9.

A glass plate (windowpane) 72 has a peripheral edge received in a channel 11a of a gasket 11, which comprises a hard molding having a substantially C-character shape in section. The gasket 11 includes an outside section 11b for pressing an exterior surface (outside surface) 72a of the glass sheet 72 from the exterior surface of an automobile, an inside section 11c for pressing an interior surface (inside surface) 72b of the glass sheet 72 from the interior surface of the automobile, and a connecting section 11d for connecting the outside section 11b and the inside section 11c. The outside section 11b, the inside section 11c and the connecting section 11d define the channel 11a, which is formed in a rectangular shape in section. The connecting section 11d has a surface opposite to a surface (channel bottom) 12 facing the glass sheet 72 formed with a lip section 11e, which is adapted for close contact with a body panel 70a.

Although the glass sheet 72 has the peripheral edge received in the channel 11a of the gasket 11, the glass sheet 72 has an end surface 72c of the peripheral edge placed out of contact with the channel bottom 12 facing the end surface 72c. The gasket 11 has support pins 15 fastened therein from the exterior surface of the automobile. In the shown mode, the plural support pins 15 are fastened in the gasket 11 at intervals along the peripheral direction of a window opening 75.

The outline of the glass sheet 72 in a projected view (surrounded by a dotted line P in FIG. 2) is larger than the outline formed by an inner periphery of the gasket 11 (surrounded by edges of the outside section 11b and the inside section 11c closer to an inner periphery of the glass sheet 72 along a surface direction of the glass sheet 72, i.e., a leftmost edge in FIG. 1, and designated by a solid line I). The outline I formed by the inner periphery of the gasket 11 is included within the outline P of the glass sheet 72 in the projected view.

Figure 2:
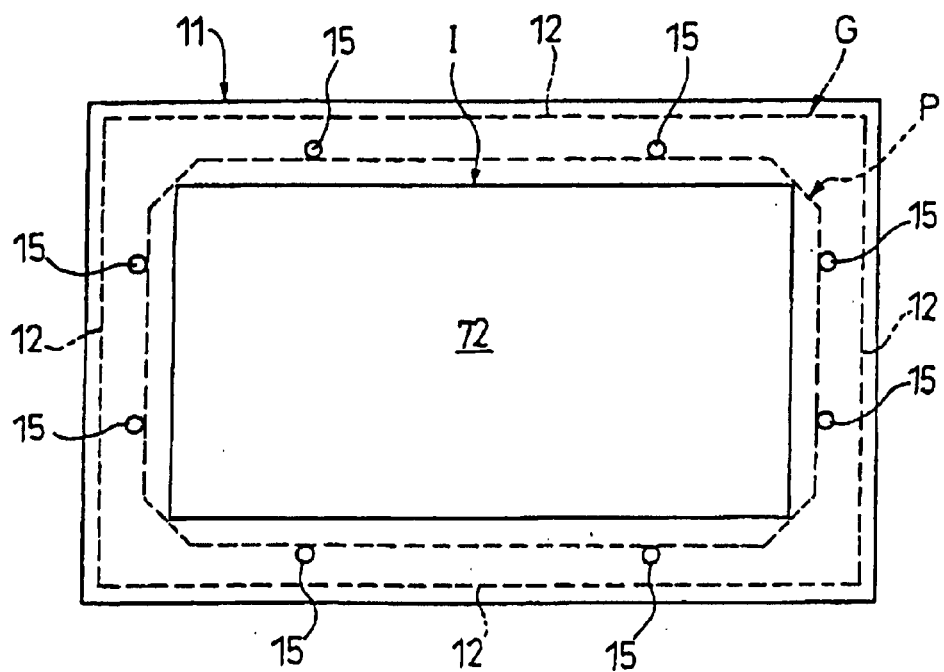
FIG. 2 is a front view showing a first mode of the windowpane removing method according to the present invention.

The outline P of the glass sheet 72 in the projected view is smaller than the outline around the channel bottom 12 of the gasket 11 (designated by a dotted line G in FIG. 2). The outline P of the glass sheet 72 in the projected view is included within the outline G around the channel bottom 12 of the gasket 11.

Each of the support pins 15 is formed with a head 15a having a larger diameter than a shaft thereof. Each of the support pins 15 has the shaft passing through the outside section 11b of the gasket 11 and crossing over the channel 11a. Each of the support pins 15 has a leading edge of the shaft received in the inside section 11c of the gasket 11. Each of the support pins 15 may have the shaft screwed in at least one of the outside section 11b and the inside section 11c.

Each of the support pins 15 has the shaft gotten in contact with the end surface 72c of the glass sheet 12. In other words, the support pins 15 support the glass sheet 72 in the gasket 11, ensuring a space (shift-allowable space) S between the end surface 72c of the glass sheet 72 and the channel bottom 12 facing the end surface 72c. Thus, the peripheral edge of the glass sheet 72, the support pins 15 and the space S are provided in the order of the peripheral edge of the glass sheet 72, the support pins 15 and the space S at the locations of the support pins 15 from an inner periphery toward an outer periphery of the glass sheet 72 in the channel 11a as seen in the surface direction of the glass sheet.

The outside section 11b of the gasket 11 has recesses 13 formed thereon to accommodate the heads 15a of the support pins 15. The head 15a of each of the support pins has an end surface (exterior surface) flush with an exterior surface of the outside section 11b of the gasket.

The gasket 11 has an adhesive 71 interposed between an attachment flange 76 and the inside section 11c. The gasket 11 is firmly fixed to the attachment flange 76 at the inside section 11c by the adhesive 71.

Now, an example of the windowpane removing method for removing the glass sheet 72 from the windowpane attaching structure 10 will be described in reference to FIG. 2 through FIG. 4. In FIG. 2 through FIG. 4, the gasket 11 is shown in enlargement for easy understanding.

In the shown mode, the gasket 11 is formed in a substantially rectangular frame shape in a plan view (as seen in a direction perpendicular to the surface direction of the glass sheet 72) and covers the entire peripheral portion of the glass sheet 72 as shown in FIG. 2. The glass sheet 72 has a rectangular shape with corners canted off (substantially rectangular shape) in the plan view. The glass sheet 72 in a substantially rectangular shape has long edges and short edges supported by a pair of support pins 15, respectively. In other words, all main edges of the glass sheet 72 are positioned by at least one of the support pins 15.

The shape of the gasket 11 and the shape of the glass sheet 72 are shown as examples. For example, the outline of the gasket 11 or the glass sheet 72 may be curved. As long as the curved outline of the gasket or the glass sheet can be microscopically regarded as including a side forming a polygonal shape in the latter case, that sort of outline is also called in the phrase "side".

The gasket 11 is fixed to the window opening. As shown in FIG. 2, the dimensions of the outline P of the glass sheet 72 in the projected view (the dimensions in the horizontal direction and the vertical direction in FIG. 2) is larger than the dimensions of the outline I formed by the inner periphery of the gasket 11. The dimensions of the outline G around by the channel bottom 12 of the gasket is larger than the dimensions of the outline P of the glass sheet 72 in the projected view.

First, the pins 15 that have supported the glass sheet 72 at an edge on the right side in FIG. 2 (right edge of the glass sheet) are removed from the gasket 11 toward the exterior side (forwardly with respect to the sheet showing FIG. 2). Next, the glass sheet 72 is shifted so as to have the right edge brought near to the channel bottom 12 in a right side portion (right side) of the gasket 11 with the pins 15 removed as seen in FIG. 2, or to have the right edge filled in the shift-allowable space S shown in FIG. 1. As a result, the glass sheet 72 has a left edge located at a position inside a left side portion (left side) of the gasket 11 as shown in FIG. 3.

Then, the support pins 15 are removed from an upper side portion (upper side) of the gasket toward the exterior side as seen in FIG. 3. The glass sheet 72 is shifted so as to have the upper edge brought near to the channel bottom 12. As a result, the glass sheet 72 has a lower edge located at a position inside a lower side portion of the gasket 11 as shown in FIG. 4. The glass sheet 72 has a left edge continuously held inside the left portion of the gasket 11.

Next, the glass sheet 72 is shifted in a direction toward a corner between the left side and the lower side of the gasket 11 (direction indicated by an arrow A in FIG. 4), having a corner between the left edge and the lower edge thereof lifted toward the exterior side (forwardly with respect to the sheet showing FIG. 4). Thus, the glass sheet 72 is removed from the window opening by having the right edge and the upper edge removed from the right side and the upper side of the gasket 11

In accordance with the windowpane attaching structure 10 and the windowpane removing method as stated earlier, the glass sheet 72 can be removed from the body panel 70a of the automobile in extremely easy fashion and in a short period of time.

As shown in FIG. 1, the adhesive 71 (working as a fastener for the glass sheet 72) is concealed by the gasket 11 on the exterior side, and the surface of the peripheral edge of the glass sheet 72 is covered by the outside section 11b of the gasket 11, offering good appearance without using a separate decorative member, such as a garnish, or a coating member in a dark color.

Figure 5:
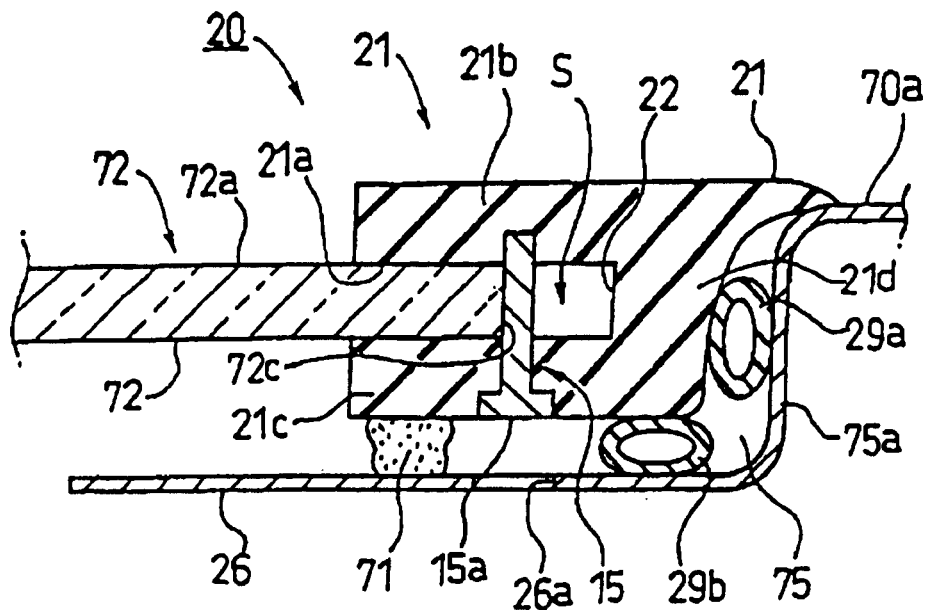
FIG. 5 is a cross-sectional view showing the essential parts of a second mode of the windowpane attaching structure according to the present invention.

FIG. 5 is a schematic cross-sectional view of a second mode of the windowpane attaching structure according to the embodiment of the present invention. The glass plate 72 has the peripheral edge received in a channel 21a of a gasket 21, which comprises a hard molding having a substantially C-character shape in section. The gasket 21 includes an outside section 21b, an inside section 21c and a connecting section 21d, which define the channel 21a, which is formed in a rectangular shape in section. The gasket 21 has a plurality of support pins 15 fastened therein from the interior side at intervals along the peripheral direction of the window opening 75. The support pins 15 may be the same as those in the first mode as stated earlier. Each of the support pins 15 has the shaft passing through the inside section 21c of the gasket 21 and crossing over the channel 21a. Each of the support pins 15 has the leading edge of the shaft received in the outside section 21b of the gasket 21. Each of the support pins 15 has the shaft gotten in contact with the end surface 72c of the glass sheet 72 to position the glass sheet 72 in a proper location and to ensure a shift-allowable space S between the end surface 72c of the glass sheet 72 and the channel bottom 22 facing the end surface 72c.

In the shown mode, the window opening 75 has a peripheral edge provided with an attachment flange 26, which is placed on the interior side with respect to an outside surface of the body panel 70a, and which has removal holes 26a for allowing the support pins 15 to be removed toward the interior side. The gasket 21 is firmly fixed to the attachment flange 26 at the inside section 21c by the adhesive 71. The gasket 21 is fixed at such a location that the support pins 15 can be removed from the interior side of the attachment flange 26 through the removal holes 26a. In the shown mode, the removal holes 26a are provided in alignment with imaginary lines extending from of the shafts of the support pins 15, and the heads 15a of the support pins 15 can be fully seen from the interior side of the attachment flange 26.

In the shown mode, the gasket 21 has a seal 29a interposed between a side wall 75a of the window opening and the connecting section 21d. The gasket 21 also has a seal 29b interposed between the attachment flange 26 and the inside section 21c at a location closer to the outer periphery thereof than the removal holes 26a.

When the glass sheet 72 is removed from the windowpane attaching structure 20, the glass sheet 72 can be shifted into and out of the shift-allowable space S by removing the support pins 15 from the gasket 21 through the removal holes 26a.

In accordance with the windowpane attaching structure 20 stated earlier, good appearance is offered since the support pins 15 are not exposed on the exterior side of the gasket 21 and since the outside section 11b of the gasket 21 has an even surface.

Figure 6:
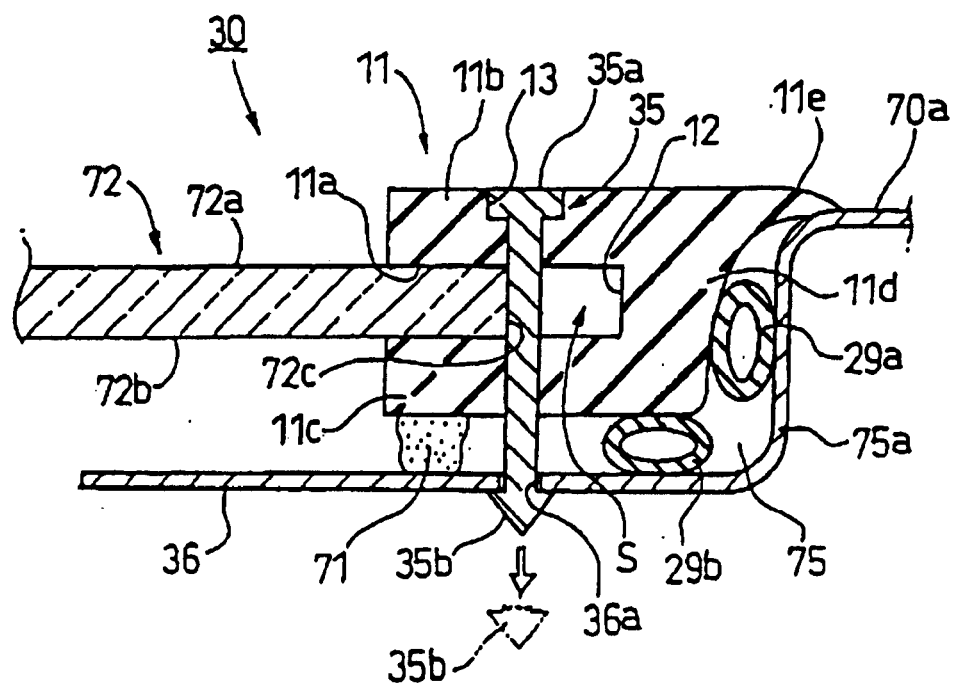
FIG. 6 is a cross-sectional view showing the essential parts of a third mode of the windowpane attaching structure according to the present invention.

FIG. 6 is a schematic cross-sectional view of a third mode of the windowpane attaching structure according to the embodiment of the present invention. The glass plate 72 has the peripheral edge received in the channel 11a of a gasket 11, which comprises a hard molding having a substantially C-character shape in section. The gasket 11 is the same as that in the first mode as stated earlier.

The gasket 11 has a plurality of support clips 35 fastened therein at intervals along the peripheral direction of the window opening 75. Each of the support clips 35 has an end closer to the exterior side provided with a head 35a having a larger diameter than the shaft thereof and has the other end closer to the interior side provided with a retainer 35b projecting from the outer periphery of the shaft. As the retainers are adopted conical ones in the shown mode. Each of the support clips has the shaft passing through the outside section 11b of the gasket 11, crossing over the channel 11a, passing through the inside section 11c of the gasket 21 and passing through a corresponding through hole 36a formed in an attachment flange 36. Each of the retainers 35b has the peripheral edge of the bottom of the conical structure engaged with the open edge of the corresponding through hole 36a.

Each of the support clips 35 has the shaft gotten in contact with the end surface 72c of the glass sheet 72 to ensure the shift-allowable space S between the end surface 72c of the glass sheet 72 and the channel bottom 12 facing the end surface 72c.

In the shown mode, the gasket 11 has the seals 29a and 29b interposed between the side wall 75a of the window opening and the connecting section lid and between the attachment flange 26 and the inside section 11c at a location closer to the outer periphery thereof than the through holes 36a. The gasket 11 is firmly fixed to the attachment flange 36 at the inside section 11c by the adhesive 71.

When the glass sheet 72 is removed from the windowpane attaching structure 30, the glass sheet 72 can be shifted into and out of the shift-allowable space S by, e.g., cutting off the retainers 35b of the support clips 35 from the shafts toward the interior side and then removing the support clips 35 toward the exterior side.

In accordance with the windowpane attaching structure 30 stated earlier, the gasket 11 can be firmly fixed to the attachment flange 36 by the retainers 35b of the support clips 35 and the adhesive 71, allowing the glass sheet to be stably retained in the window opening 75.

Figure 7:
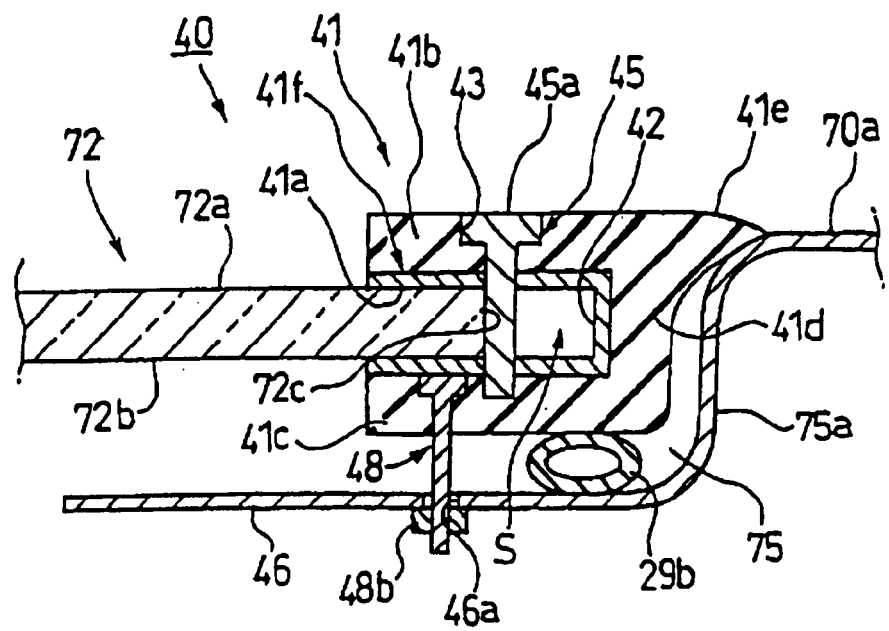
FIG. 7 is a cross-sectional view showing the essential parts of a fourth mode of the windowpane attaching structure according to the present invention.

FIG. 7 is a schematic cross-sectional view of a fourth mode of the windowpane attaching structure according to the embodiment of the present invention. The glass plate 72 has the peripheral edge received in a channel 41a of a gasket 41, which be formed by covering a metallic member 41f having a C-character shape in section with a hard molding. The channel 41a is defined by the inner surface of the C-character shaped member 41f and is formed in a rectangular shape in section. The C-character shaped member 41f has the outer surface on an exterior side wall covered by an outside section 41b of the molding. The C-character shaped member 41f has the outer surface on an interior side wall covered by an inside section 41c of the molding. The C-character shaped member 41f has the outer surface on a connecting wall (surface opposite to the bottom 42 of the channel) covered by a connecting section 41d of the molding.

The gasket 41 has a plurality of support pins 45 fastened therein from the exterior side at intervals along the peripheral direction of the window opening 75. Each of the support pins 45 is formed with a head 45a having a larger diameter than a shaft thereof. Each of the support pins 45 has the shaft threaded. Each of the support pins 45 has the shaft passing through the outside section 41b of the gasket 41, passing through the outside wall of the C-character shaped member 41f, crossing over the channel 41a and screwed in the interior side wall of the C-character shaped member 41f.

Each of the support pins 45 has the shaft gotten in contact with the end surface 72c of the glass sheet 72 to ensure the shift-allowable space S between the end surface 72c of the glass sheet 72 and the channel bottom 42 facing the end surface 72c.

The inside section 41c of the molding has ends (heads) of attaching bolts 48 embedded therein, and the other ends (leading edges) of the attaching bolts 48 project toward the interior side from the inside section 41c of the molding. The leading edges of the attaching bolts 48 pass through holes 46a formed in an attachment flange 46. The leading edges of the attaching bolts 48 have nuts 48b screwed thereon. Thus, the gasket 41 is firmly fixed to the attachment flange 46 by the attaching bolts 48 and the nuts 48b in the shown mode.

In the shown mode, the gasket has a seal 29b interposed between the attaching flange and the inside section 41c of the molding at a location closer to the outer periphery thereof than the holes 46a.

When the glass sheet 72 is removed from the windowpane attaching structure 40, the glass sheet 72 can be shifted into and out of the shift-allowable space S by removing the support pins 45 from the gasket 41 from the exterior side.

In accordance with the windowpane attaching structure 40 stated earlier, the glass sheet 72 can be stably retained in the window opening 75 since the glass sheet 72 has the peripheral edge received in the channel 41a of the C-character shaped member 41f made of metallic material having a higher rigidity than plastic material and supported by the support pins 45 screwed through the C-character shaped member 41f. The C-character shaped member 41f, which is made of metallic material, can be easily subjected to machining, such as threading.

The present invention is not limited to the modes stated earlier, and proper modifications or improvement are possible.

Figure 8:
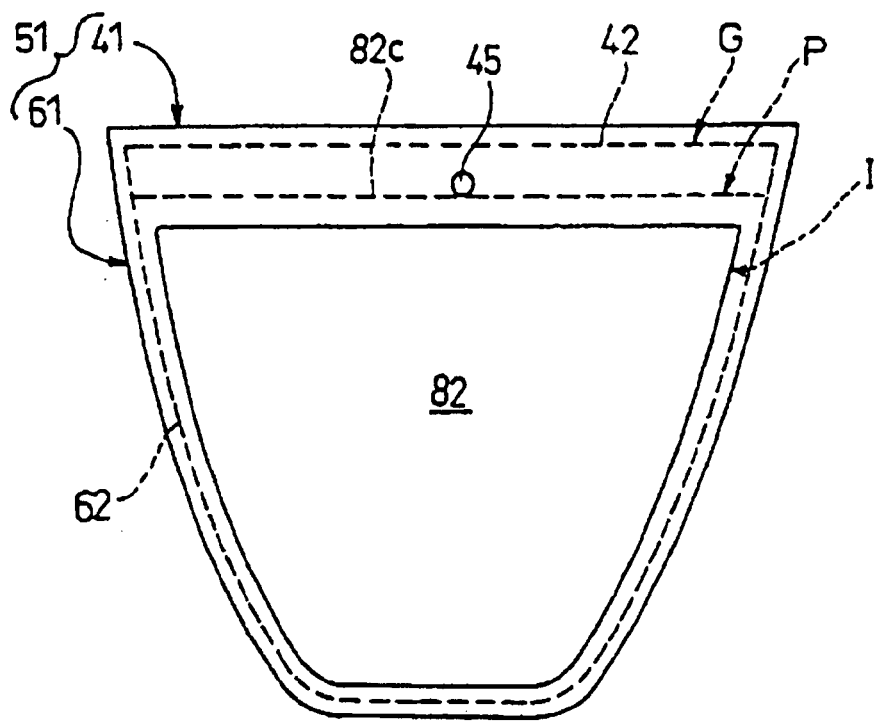
FIG. 8 is a cross-sectional view showing the essential parts of a fifth mode of the windowpane attaching structure according to the present invention.

The windowpane attaching structure according to the present invention may be applied to a portion of the peripheral edge of a glass sheet. For example, the windowpane attaching structure 40 shown in FIG. 7 or one of the other windowpane attaching structures may be applied to only a liner section of the peripheral edge of a glass sheet 82 in a substantially semi-elliptical shape in a plan view as shown in FIG. 8. The gasket 51 shown in FIG. 8 is formed in such a shape that a gasket 61 having a substantially U-character shape in the plan view is connected to both ends of a gasket 41 having a substantially linear shape in the plan view. The linear gasket 41 has a channel bottom 42 out of contact with a peripheral end surface of the glass sheet 82. The U-character shaped gasket 61 has a channel bottom 62 gotten in slidable contact with the peripheral end surface of the glass sheet 82.

As shown in FIG. 8, the outline P of the glass sheet 82 is larger than the outline I formed by the inner periphery of the gasket 51 in a projected view. The outline P of the glass sheet 82 is smaller than the outline G around by the channel bottoms 42, 62 of the gasket 51 in a projected view.

When the glass sheet 82 is removed from the gasket 51, a support pin 45 is removed first. Next, the glass sheet 82 is shifted toward the channel bottom 42 of the gasket 41, in which the support pin 45 was fastened before removal. As a result, the glass sheet 82 has a rear edge in the shifting direction (lower edge in FIG. 8) located inside the gasket 61, and the glass sheet 82 can be removed toward the exterior side from the rear edge.

The number of the support member(s) is properly determined so that a windowpane can be supported without being shifted. In other words, the number of the support member(s) is determined depending on the shape or the dimensions of a windowpane. Specifically speaking, in the case of a big windowpane having a substantially rectangular shape, a plurality of support members are assigned to each of the four edges of the windowpane accordingly. The windowpane is supported so as to have the four edges sandwiched between the support members. In the case of a small windowpane, a single support member may be assigned to each of the four edge of the windowpane accordingly. In the case of a small windowpane having a substantially triangular shape, a single support member can be used to support the windowpane without the windowpane being shifted.

INDUSTRIAL APPLICABILITY

As explained, in accordance with the present invention, a windowpane can be removed from the body panel of an automobile in extremely easy fashion and in a short period of time. Additionally, the windowpane can dispense with, e.g., several sorts of adhesives or a coating member since the windowpane can be attached to the body panel and be mechanically supported by a gasket by fixing the gasket to the body panel through an adhesive. Thus, the windowpane, which has been removed from the body panel, can be supplied into a materials vessel for windowpanes as it is, facilitating recycling.

The entire disclosure of Japanese Patent Application No. 2000-127817 filed on Apr. 27, 2000 including specification, claims, drawings and summary is incorporated herein by reference in its entirety.

What is claimed is:

1. A windowpane attaching structure, wherein a windowpane has a peripheral edge received in a channel of a gasket having a C-character shape in section, the windowpane has the gasket fitted thereto, and the windowpane is attached to an edge defining a window opening of an automobile through the gasket;
    a space defined by an end surface of the windowpane and a surface in the channel facing the end surface at at least a portion of an entire periphery of the channel, the space allowing the windowpane to shift in the channel;
    a support member fastened to the gasket and contacting the end surface of the windowpane in the channel and precluding the windowpane from shifting therein, the support member being removable from the gasket.

2. The windowpane attaching structure according to claim 1, wherein the windowpane has an outline, which is larger than an outline formed by an inner periphery of the gasket and smaller than an outline around the surface in the channel in a projected view.

3. The windowpane attaching structure according to claim 1, wherein the peripheral edge of the windowpane, the support member and the space are provided in an order of the peripheral edge of the windowpane, the support member and the space from an inner periphery of the channel toward the surface in the channel as seen in a surface direction of the windowpane.

4. The windowpane attaching structure according to claim 1, wherein a plurality of support members are fastened in the gasket at intervals around the entire periphery of the windowpane.

5. The windowpane attaching structure according to claim 1, wherein the support member comprises a support pin having a shaft extending substantially parallel with the end surface of the windowpane, the support pin is fastened in the gasket so as to pass through the gasket in a direction perpendicular to a surface of the windowpane, and the shaft of the support pin contacts the end surface of the windowpane to support the windowpane.

6. A windowpane removing method for removing a windowpane from a windowpane attaching structure, wherein a windowpane has a peripheral edge received in a channel of a gasket having a C-character shape in section, the windowpane has the gasket fitted thereto, and the windowpane is attached to an edge defining a window opening of an automobile through the gasket; the method comprising:
    configuring a windowpane attaching structure so as to support the windowpane in the gasket by a support member so as to ensure a space between an end surface of the peripheral edge of the windowpane and a surface in the channel, the support member being removable from the gasket; and
    removing the support member from the gasket, properly moving the windowpane so as to be shifted into and out of the channel, and removing the windowpane from the window opening.

7. The windowpane removing method according to claim 6, further comprising forming the support member by use of a plurality of support members, the one or more support members of the plurality of support members being placed along an edge of the windowpane; removing one or more support members of the plurality of support members from the gasket; then, shifting the edge of the windowpane corresponding to the removed support member or members toward the surface in the channel facing the end surface of the edge of the windowpane; and removing the remaining support member or members from the gasket to remove the windowpane from the window opening.

* * * * *